United States Patent
Jung et al.

(10) Patent No.: US 12,323,981 B2
(45) Date of Patent: Jun. 3, 2025

(54) METHOD AND APPARATUS FOR TRANSMITTING INFORMATION ON AN UPLINK CHANNEL

(71) Applicant: Lenovo (Singapore) Pte. Ltd., New Tech Park (SG)

(72) Inventors: Hyejung Jung, Northbrook, IL (US); Joachim Löhr, Wiesbaden (DE); Vijay Nangia, Woodridge, IL (US); Hossein Bagheri, Urbana, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 213 days.

(21) Appl. No.: 17/632,022

(22) PCT Filed: Aug. 13, 2020

(86) PCT No.: PCT/IB2020/057649
§ 371 (c)(1),
(2) Date: Feb. 1, 2022

(87) PCT Pub. No.: WO2021/028873
PCT Pub. Date: Feb. 18, 2021

(65) Prior Publication Data
US 2022/0279505 A1    Sep. 1, 2022

Related U.S. Application Data

(60) Provisional application No. 62/886,324, filed on Aug. 13, 2019.

(51) Int. Cl.
*H04W 72/21* (2023.01)
*H04L 1/1812* (2023.01)
(Continued)

(52) U.S. Cl.
CPC .......... *H04W 72/21* (2023.01); *H04L 1/1812* (2013.01); *H04L 5/0044* (2013.01);
(Continued)

(58) Field of Classification Search
CPC . H04W 72/21; H04W 72/1268; H04W 72/23; H04W 72/542; H04W 72/569;
(Continued)

(56) References Cited

U.S. PATENT DOCUMENTS

2015/0264678 A1    9/2015    Yin et al.
2016/0066282 A1    3/2016    Ouchi et al.
(Continued)

FOREIGN PATENT DOCUMENTS

CN    107211439 A    9/2017
CN    114175563 A    8/2020
(Continued)

OTHER PUBLICATIONS

Intel Corporation, On enhancements to intra-UE multiplexing for IIoT, R1-1902499, 3GPP TSG RAN WG1 Meeting#96, Athens, Greece, Feb. 25-Mar. 1, 2019.
(Continued)

*Primary Examiner* — Mang Hang Yeung
(74) *Attorney, Agent, or Firm* — FIG. 1 Patents

(57) ABSTRACT

First information of a DL assignment for a first PDSCH of a serving cell can be received (410). A first PUCCH resource and a second PUCCH resource can be identified (420) for HARQ-ACK feedback of the first PDSCH. A starting symbol of the second PUCCH resource can be later than a starting symbol of the first PUCCH resource. Second information of a DL assignment for a second PDSCH of the serving cell can be received (430). A starting symbol of the second PDSCH can be later than a starting symbol of the first PDSCH. A determination can be made (440) as to (Continued)

whether to delay the HARQ-ACK feedback of the first PDSCH for processing of the second PDSCH. HARQ-ACK information of the first PDSCH can be transmitted (450) on the second PUCCH resource in response to determining to delay the HARQ-ACK feedback of the first PDSCH.

18 Claims, 5 Drawing Sheets

(51) Int. Cl.
*H04L 5/00* (2006.01)
*H04W 72/1268* (2023.01)
*H04W 72/23* (2023.01)
*H04W 72/542* (2023.01)
*H04W 72/566* (2023.01)

(52) U.S. Cl.
CPC ....... *H04L 5/0053* (2013.01); *H04W 72/1268* (2013.01); *H04W 72/23* (2023.01); *H04W 72/542* (2023.01); *H04W 72/569* (2023.01)

(58) Field of Classification Search
CPC .... H04W 72/56; H04L 1/1812; H04L 5/0044; H04L 5/0053; H04L 5/0042; H04L 5/0055; H04L 5/0064; H04L 5/0078; H04L 5/0094
USPC ......................................................... 370/329
See application file for complete search history.

(56) References Cited

U.S. PATENT DOCUMENTS

| | | | |
|---|---|---|---|
| 2017/0034850 A1 | 2/2017 | Rico Alvarino et al. | |
| 2018/0324635 A1 | 11/2018 | Babaei et al. | |
| 2019/0230690 A1 | 7/2019 | Akkarakaran et al. | |
| 2020/0037314 A1 | 1/2020 | Xiong et al. | |
| 2020/0221452 A1 | 7/2020 | Takahashi et al. | |
| 2020/0274637 A1 | 8/2020 | Li et al. | |
| 2021/0329663 A1* | 10/2021 | Wong | H04W 72/569 |
| 2022/0159701 A1 | 5/2022 | Islam et al. | |
| 2022/0279538 A1 | 9/2022 | Jung et al. | |
| 2023/0179342 A1* | 6/2023 | Zhang | H04L 1/1854 |
| | | | 370/329 |

FOREIGN PATENT DOCUMENTS

| | | |
|---|---|---|
| CN | 114208352 A | 3/2022 |
| EP | 4014405 | 8/2020 |
| EP | 4014406 | 6/2022 |
| IN | 242022 | 6/2022 |
| WO | 2018203686 A1 | 11/2018 |
| WO | 2021028872 A1 | 2/2021 |
| WO | 2021028873 A1 | 2/2021 |

OTHER PUBLICATIONS

Jung, Hyejung , et al., "Pursuant to MPEP § 2001.06(b) the applicant brings the following co-pending application to the Examiner's attention:", U.S. Appl. No. 62/886,324, filed Aug. 13, 2019, 31 pages.
"Non-Final Office Action", U.S. Appl. No. 17/632,009, filed Nov. 14, 2024, 13 pages.
"Foreign Office Action", CN Application No. 202080056730.7, Dec. 23, 2024, 28 pages.
Institute for Information Indust, "Enhancement on HARQ-ACK feedback for URLLC", 3GPP TSG RAN WG1 #96, R1-1902742, Athens, Greece, Feb. 2019, 5 pages.
Nokia, et al., "On enhanced HARQ-ACK feedback for URLLC", 3GPP TSG RAN WG1 Meeting #94-bis, R1-1810667, Chengdu, P.R. China, Oct. 2018, 4 pages.
"Corrected Notice of Allowability", U.S. Appl. No. 17/632,009, filed Apr. 16, 2025, 2 pages.
"Notice of Allowance", U.S. Appl. No. 17/632,009, filed Mar. 26, 2025, 7 pages.

* cited by examiner

METHOD AND APPARATUS FOR TRANSMITTING INFORMATION ON AN UPLINK CHANNEL

BACKGROUND

1. Field

The present disclosure is directed to a method and apparatus for transmitting information on an uplink channel.

2. Introduction

Presently, wireless communication devices, such as User Equipment (UE), communicate with other communication devices using wireless signals. In Rel-15 New Radio (NR), if a UE has to send Uplink Control Information (UCI) and a Physical Uplink Control Channel (PUCCH) resource for UCI that does not include a Scheduling Request (SR), e.g. Hybrid Automatic Repeat Request-Acknowledgement (HARQ-ACK), Periodic Channel State Information (P-CSI), and/or Semi-Persistent CSI (SP-CSI), collides with a Physical Uplink Shared Channel (PUSCH) (with or without an Uplink Shared Channel (UL-SCH)), Physical Layer (PHY) at the UE multiplexes UCI in the PUSCH. Depending on the existence of Uplink (UL) data Transport Block (TB) (i.e. UL-SCH), the rate-matching of the UCI changes. If the PUCCH collides with multiple PUSCH grants, there are clear PHY rules to determine which PUSCH is used for UCI multiplexing, without the PHY knowing which logical channel is mapped to which PUSCH.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Figure 1:
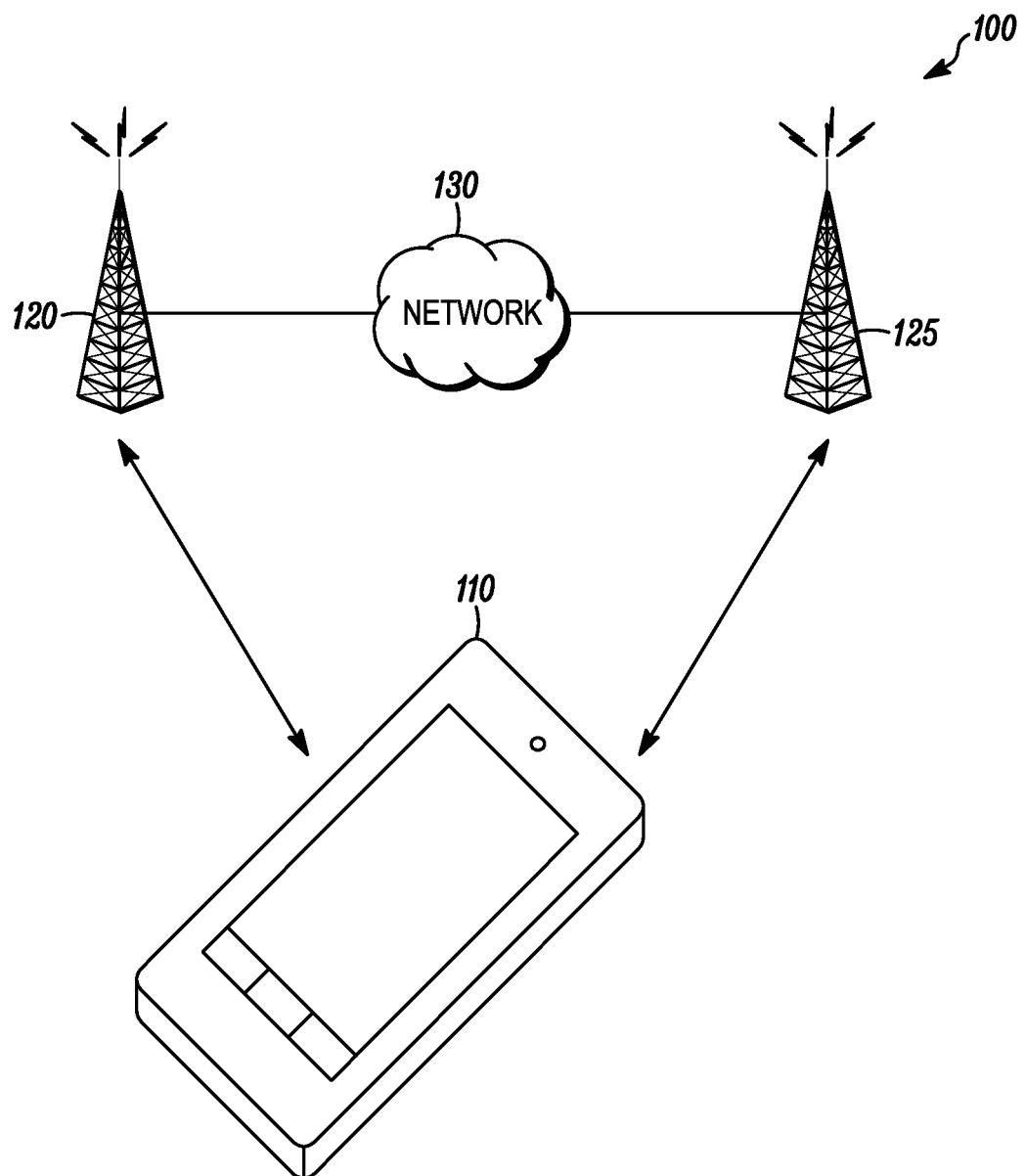
FIG. 1 is an example block diagram of a system according to a possible embodiment.

Embodiments provide a method and apparatus for transmitting information on an uplink channel. At least some embodiments can provide methods to handle UL data/control and control/control resource collision. At least some embodiments can provide a method to address resource collision between SR associated with high-priority traffic and uplink data of lower-priority traffic. At least some embodiments can provide for prioritization and/or multiplexing behavior among HARQ-ACK/SR/CSI and PUSCH for traffic with different priorities, including the cases with UCI on PUCCH and UCI on PUSCH.

At least some embodiments can provide methods to handle multiple unicast data channels associated with different traffic types.

At least some embodiments can provide for a UE to receive information of two PUCCH resources (earlier and later ones) for HARQ-ACK feedback of a first PDSCH (potentially, a low priority PDSCH) and uses a later PUCCH resource for HARQ-ACK feedback of the first PDSCH, if the UE has to delay processing of the first PDSCH due to a later received second PDSCH (potentially, a high priority PDSCH). Furthermore, embodiments can provide HARQ-ACK codebook construction methods for the earlier PUCCH and later PUCCH. Providing two PUCCH resources for the low priority PDSCH can be used to minimize eMBB throughput degradation due to URLLC traffics and is expected to be resource-efficient compared to frequent retransmissions of eMBB PDSCH caused by dropping of eMBB PDSCH processing.

At least some embodiments can provide detailed rules to drop or multiplex a CSI report(s) with other UCI and/or UL data based on an indicated physical layer priority of a PUCCH resource for the CSI report(s). This priority indication can be used by a network entity to maintain up-to-date CSI information for UE's PCell or for TRPs or a serving cell that serve(s) UE's URLLC traffics.

According to a possible embodiment, a PUCCH configuration including information of at least one PUCCH resource can be received at a UE. An UL grant for at least one high-priority PUSCH can be received. The UL grant can indicate the UE to include a CSI report in the at least one high-priority PUSCH. A particular PUSCH of the at least one high-priority PUSCH can overlap with a PUCCH resource of the at least one PUCCH resource. A determination can be made as to whether there is UCI to transmit on the PUCCH resource. The particular PUSCH can be transmitted according to the UL grant by including the CSI report in the particular PUSCH when there is UCI to transmit on the PUCCH resource.

According to a possible embodiment, first information of a DL assignment for a first PDSCH of a serving cell can be received. A first PUCCH resource and a second PUCCH resource can be identified for HARQ-ACK feedback of the first PDSCH. A starting symbol of the second PUCCH resource can be later than a starting symbol of the first PUCCH resource. Second information of a DL assignment for a second PDSCH of the serving cell can be received. A starting symbol of the second PDSCH can be later than a starting symbol of the first PDSCH. A determination can be made as to whether to delay the HARQ-ACK feedback of the first PDSCH for processing of the second PDSCH. HARQ-ACK information of the first PDSCH can be transmitted on the second PUCCH resource in response to determining to delay the HARQ-ACK feedback of the first PDSCH.

FIG. 1 is an example block diagram of a system 100 according to a possible embodiment. The system 100 can include a UE 110, at least one network entity 120 and 125, and a network 130. The UE 110 can be a wireless wide area network device, a user device, a wireless terminal, a portable wireless communication device, a smartphone, a cellular telephone, a flip phone, a personal digital assistant, a smartwatch, a personal computer, a tablet computer, a laptop computer, a selective call receiver, an Internet of Things (IoT) device, or any other user device that is capable of sending and receiving communication signals on a wireless network. The at least one network entity 120 and 125 can be a wireless wide area network base station, can be a NodeB, can be an enhanced NodeB (eNB), can be a New Radio (NR) NodeB (gNB), such as a Fifth Generation (5G) NodeB, can be an unlicensed network base station, can be an access point, can be a base station controller, can be a network controller, can be a Transmission and Reception Point (TRP), can be a different type of network entity from the other network entity, and/or can be any other network entity that can provide wireless access between a UE and a network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a NR network, a 3rd Generation Partnership Project (3GPP)-based network, a 5G network, a satellite communications network, a high altitude platform network, the Internet, and/or other communications networks.

In operation, the UE 110 can communicate with the network 130 via at least one network entity 120. For example, the UE 110 can send and receive control signals on a control channel and user data signals on a data channel.

If a PUCCH collides with multiple PUSCH grants, PHY rules can be used to determine which PUSCH is used for UCI multiplexing, without the PHY knowing which logical channel is mapped to which PUSCH. Similar principle can be applied in Rel-16 NR intra-UE multiplexing for Ultra Reliable Low Latency Communications (URLLC) and enhanced Mobile Broadband (eMBB). For example, if a PUCCH resource for eMBB UCI collides with two non-overlapping PUSCHs, such as one with a URLLC TB and another with an eMBB TB, the PHY can multiplex eMBB UCI in the PUSCH with eMBB TB. In order for PHY at the UE and at the gNB to know which PUSCH has eMBB TB, a PHY level indication (e.g. indication via UL/Downlink (DL) Downlink Control Information (DCI)) can be used.

In Rel-15 NR (3GPP TS 38.213), rules were specified to transmit different UCI in PUCCH and/or PUSCH at a UE. However, the Rel-15 NR specification does not provide methods to handle collisions of UCI and UL-SCH of different traffic types.

For multiple PUCCHs based CSI reporting in a slot for dropping and multiplexing rules for multiple CSI reports, if a UE is not provided multi-CSI-PUCCH-ResourceList or if PUCCH resources for transmissions of CSI reports do not overlap in a slot, a long PUCCH carrying a CSI report (i.e. PUCCH format 3 & 4) can be time-domain multiplexed with a short PUCCH carrying a CSI report (i.e. PUCCH format 2) in the slot. If the UE is provided multi-CSI-PUCCH-ResourceList and if any of the multiple PUCCH resources overlap, the UE can multiplex all CSI reports in a resource from the resources provided by multi-CSI-PUCCH-ResourceList, as described in Subclause 9.2.5.2 of TS 38.213.

For PUCCH and/or PUSCH overlapping with PUCCH and/or PUSCH resources that do not meet timing conditions, a UE may not expect a PUCCH or a PUSCH that is in response to a DCI format detection to overlap with any other PUCCH or PUSCH that does not satisfy the timing conditions described in Subclause 9.2.5 of TS 38.213.

For transmission of HARQ-ACK and CSI in multiple PUCCHs, if a UE is not provided simultaneousHARQ-ACK-CSI and if the UE would transmit HARQ-ACK information in a long PUCCH (PUCCH format 1, 3, or 4) in a given slot, the UE may not transmit a long PUCCH for CSI reports (PUCCH format 3 or 4) and the UE may not transmit overlapping short PUCCH for CSI report (PUCCH format 2) in the slot. If the UE is not provided simultaneousHARQ-ACK-CSI and if the UE would transmit HARQ-ACK information with PUCCH format 0 or PUCCH format 2, the UE may not transmit any PUCCH with PUCCH format 2, PUCCH format 3, or PUCCH format 4 for transmission of CSI reports, if they overlap with any resource from the resources for transmission of HARQ-ACK information.

For UCI multiplexing on a PUSCH with UL-SCH, a UE can multiplex HARQ-ACK information and/or CSI reports in a PUSCH if the PUCCH resource overlaps in time with a PUSCH transmission, as described in Subclause 9.3 of TS38.213, and may not transmit SR. In case the PUCCH resource overlaps in time with multiple PUSCH transmissions, the PUSCH for multiplexing HARQ-ACK information and/or CSI can be selected as described in Subclause 9 of TS38.213. If the PUSCH transmission by the UE is not in response to a DCI format detection and the UE multiplexes only CSI reports, the timing conditions may not be applicable.

If PUSCH without UL-SCH overlaps with a PUCCH including positive SR on a serving cell, where symbol "*" in SR means when SR is positive,

TABLE 1

| PUSCH without UL-SCH overlapping with a PUCCH incuding positive SR | | | | |
|---|---|---|---|---|
| SP-CSI on PUSCH without UL-SCH | A-CSI-only on PUSCH without UL-SCH | HARQ-ACK | SR | UE behaviour |
| | * | | * | Drop A-CSI-only on PUSCH, transmit SR on PUCCH. |
| | * | * | * | Drop A-CSI-only on PUSCH, transmit SR and HARQ-ACK on PUCCH. |
| * | | | * | Drop SP-CSI on PUSCH, transmit SR on PUCCH |
| * | | * | * | Drop SP-CSI on PUSCH, transmit HARQ-ACK and SR on PUCCH |

Based on Rel-15 3GPP NR specification (3GPP TS 38.213 V15.6.0), a UE can generate HARQ-ACK information in response to receiving a PDSCH associated with DCI format 1_0 or DCI format 1_1 whose CRC is scrambled with a C-RNTI, an MCS-C-RNTI, or a CS-RNTI. If a UE receives a PDSCH without receiving a corresponding PDCCH, or if the UE receives a PDCCH indicating a SPS PDSCH release, the UE can generate one corresponding HARQ-ACK information bit. If a UE is not provided PDSCH-CodeBlockGroup Transmission, the UE can generate one HARQ-ACK information bit per transport block. For a HARQ-ACK information bit, a UE can generate an ACK if the UE detects a DCI format 1_0 that provides a SPS PDSCH release or correctly decodes a transport block, and can generate a NACK if the UE does not correctly decode the transport block. To transmit multiple HARQ-ACK bits in one PUCCH or PUSCH resource, a UE can construct a HARQ-ACK codebook according to rules defined in Subclauses 9.1 of 3GPP TS 38.213 V15.6.0.

Based on 3GPP TS 38.321, the Scheduling Request (SR) can be used for requesting UL-SCH resources for new transmission. Each SR configuration can correspond to one or more logical channels. Each logical channel can be mapped to zero or one SR configuration, which can be configured by Radio Resource Control (RRC). The SR configuration of the logical channel that triggered the BSR (if such a configuration exists) can be considered as corresponding SR configuration for the triggered SR.

At least some embodiments can provide for handling of UL data/control and control/control resource collision for traffics with different priorities.

For example, at least some embodiments can provide various methods for a UE to transmit UCI and/or UL-SCH when multiple PUSCHs and/or PUCCHs for the UE overlap.

Assuming that UL DCI and/or an RRC configuration indicates a priority of a corresponding UL grant of PUSCH and a priority of a configured PUCCH resource and that DL DCI and/or an RRC configuration indicates a priority of a corresponding DL assignment of PDSCH and a priority of associated HARQ-ACK feedback, a UE can determine which PUSCH or PUCCH it will transmit among colliding PUSCHs and PUCCHs, according to PHY dropping/multiplexing rules. In one example, lower priority uplink channels (i.e. PUSCH and PUCCH) can include Rel-15 NR uplink channels that are dynamically scheduled or semi-persistently activated based on Rel-15 NR DCI formats or that are configured based on Rel-15 NR RRC parameters.

In one implementation, the UE can drop/cancel transmission of a lower priority PUCCH, if the lower priority PUCCH overlaps with a higher priority PUCCH. Similarly, the UE can drop/cancel transmission of a lower priority PUSCH, if the lower priority PUSCH overlaps with a higher priority PUSCH.

In another implementation, if a high priority PUCCH carrying URLLC HARQ-ACK information, URLLC SR, and/or a URLLC CSI report overlaps in time with a high priority PUSCH with UL-SCH and one or more timing conditions (if applicable) for multiplexing are satisfied, the UE can multiplex the URLLC HARQ-ACK information and/or the URLLC CSI report in the high priority PUSCH with UL-SCH and may not transmit the high priority PUCCH including URLLC SR. One example of the URLLC CSI report can be an indication of CQI offset/adjustment that would be transmitted on the high priority PUCCH together with URLLC HARQ-ACK. Furthermore, if the UE is indicated to send a semi-persistent or aperiodic CSI report in the high priority PUSCH with UL-SCH, the UE can multiplex only the URLLC HARQ-ACK information in the high priority PUSCH and may not multiplex the URLLC CSI report that would be transmitted on the high priority PUCCH. This can be because the semi-persistent or aperiodic CSI report that is triggered by a network entity and would be transmitted on the high priority PUSCH may include more important CSI than the URLLC CSI report that would be transmitted on the high priority PUCCH. If the high priority PUCCH resource overlaps in time with multiple high priority PUSCHs that satisfy timing conditions for UCI multiplexing, a high priority PUSCH that carries aperiodic CSI can be selected for UCI multiplexing. If there is no high priority PUSCH carrying aperiodic CSI, a high priority PUSCH that is scheduled by a dynamic UL grant, is in a serving cell with the smallest ServCellIndex, and starts earlier in a given serving cell can be selected for UCI multiplexing.

In other implementations, if a UE would transmit a high priority PUSCH without UL-SCH that overlaps with a high priority PUCCH transmission that includes positive SR information (e.g. URLLC SR), the UE may not transmit the high priority PUSCH. If a high priority PUCCH carrying URLLC HARQ-ACK information, but not including URLLC SR information, overlaps in time with a high priority PUSCH without UL-SCH and one or more timing conditions (if applicable) for multiplexing are satisfied, the UE can multiplex the URLLC HARQ-ACK information in the high priority PUSCH without the UL-SCH and may not transmit the high priority PUCCH. For both cases, the high priority PUSCH without UL-SCH can include a semi-persistent or aperiodic CSI report.

In one embodiment, a UE can receive an indication of physical layer priority for a PUCCH resource configured for a CSI report(s), and can determine whether to multiplex the CSI report(s) with other UCI and/or UL data or to drop the CSI report(s) based on the indicated physical layer priority of the PUCCH resource for the CSI report(s). In one example, a network entity can configure a UE with a high priority PUCCH resource(s) in a CSI report configuration of a primary cell (PCell) so that the network entity can maintain up-to-date CSI information for the UE's PCell even when the UE has URLLC traffics. In another example, the network entity can configure the UE with a high priority PUCCH resource(s) in a CSI report configuration of one or more transmission and reception points (TRPs) or a serving cell that serve(s) the UE's URLLC traffics. The CSI report(s) can be transmitted periodically or semi-persistently, where semi-persistent CSI reporting is activated or deactivated via a Medium Access Control (MAC) Control Element (CE) in PDSCH. In one implementation, if the physical layer priority is not explicitly included in PUCCH resource configuration for the CSI report(s), the UE can assume that the PUCCH resource for the CSI report(s) is configured as low priority in physical layer.

In one example, if a PUCCH resource for a CSI report(s) is configured as a high priority PUCCH and overlaps with a PUCCH for URLLC SR information, then the CSI report(s) and URLLC SR information can be multiplexed in a high priority PUCCH that ends no later than the PUCCH resource for the URLLC SR information. If the PUCCH resource for the CSI report(s) is configured as a low priority PUCCH and overlaps with the PUCCH for URLLC SR information, the UE may not transmit the CSI report(s).

In one example, if a PUCCH resource for a CSI report(s) is configured as a high priority PUCCH and overlaps with a PUCCH for URLLC SR information, the CSI report(s) and URLLC SR information can be multiplexed in a high priority PUCCH, where inter-slot frequency hopping is enabled for the high priority PUCCH including the CSI report(s) and the URLLC SR information (e.g., via RRC parameter interslotFrequencyHopping defined in TS 38.331) and a first hop of the high priority PUCCH ends no later than the PUCCH resource for the URLLC SR information.

In another example, if a PUCCH resource for a CSI report(s) is configured as a high priority PUCCH and overlaps with a PUCCH resource for URLLC HARQ-ACK information, the CSI report(s) and URLLC HARQ-ACK information can be multiplexed in a high priority PUCCH that ends no later than the PUCCH resource for the URLLC HARQ-ACK information. If the PUCCH resource for the CSI report(s) is configured as a low priority PUCCH and overlaps with the PUCCH resource for the URLLC HARQ-ACK information, the UE may not transmit the CSI report(s).

In one example, if a PUCCH resource for a CSI report(s) is configured as a high priority PUCCH and overlaps with a PUCCH for URLLC HARQ-ACK information, the CSI report(s) and URLLC HARQ-ACK information can be multiplexed in a high priority PUCCH, where inter-slot frequency hopping is enabled for the high priority PUCCH including the CSI report(s) and the URLLC HARQ-ACK information (e.g., via RRC parameter interslotFrequency-Hopping defined in TS 38.331) and a first hop of the high priority PUCCH ends no later than the PUCCH resource for the URLLC HARQ-ACK information.

In other examples, if a PUCCH resource for a CSI report(s) is configured as a high priority PUCCH and overlaps with a URLLC PUSCH, and if a UE does not multiplex an aperiodic or semi-persistent CSI report(s) in the URLLC PUSCH, then the UE can multiplex the CSI report(s) in the URLLC PUSCH. If the PUCCH resource for the CSI report(s) is configured as a low priority PUCCH or if the UE multiplexes an aperiodic or semi-persistent CSI report(s) in the URLLC PUSCH, the UE may not transmit the CSI report(s).

In other examples, if a PUCCH resource for a CSI report(s) is configured as a high priority PUCCH and overlaps with a PUCCH resource for eMBB SR and/or eMBB HARQ-ACK, the UE may not transmit eMBB SR and/or eMBB HARQ-ACK. If a PUCCH resource for a CSI report(s) is configured as a low priority PUCCH, the UE can multiplex the CSI report(s) with eMBB SR and/or eMBB HARQ-ACK as specified in 3GPP TS 38.213. Alternatively, the UE may not be expected to be configured with a high priority PUCCH for CSI reporting that overlaps with a PUCCH including eMBB SR and/or eMBB HARQ-ACK.

In other examples, if a PUCCH resource for a CSI report(s) is configured as a high priority PUCCH and overlaps with a low priority PUSCH (including eMBB UL-SCH), the UE may not transmit or cancels transmission of the low-priority PUSCH including eMBB UL-SCH. If a PUCCH resource for a CSI report(s) is configured as a low priority PUCCH, the UE can multiplex the CSI report(s) in the low priority PUSCH (if applicable timing conditions are satisfied) or can consider it as an error case (if applicable timing conditions are not satisfied) as specified in 3GPP TS 38.213. Alternatively, the UE may not be expected to be configured with a high priority PUCCH for CSI reporting that overlaps with a PUSCH including eMBB UL-SCH.

In other examples, the UE can determine the priority for a PUCCH resource based on one or more of the following: a slot index; a sub-slot index (e.g., in sub-slot-based HARQ-ACK feedback procedure, where for a given sub-slot configuration, a UE can be configured with PUCCH resource set(s), and the starting symbol of a PUCCH resource can be defined with respect to the first symbol of a sub-slot); a control resource set (CORESET) index, e.g., the CORESET index where the corresponding DCI is sent, e.g., the DCI for A-CSI trigger, the DCI for SP-CSI activation, or the DCI for PDSCH scheduling; and a higher layer signaling index per CORESET that is used to generate acknowledgement (ACK)/negative acknowledgement (NACK) codebook identified by the index (e.g., in case of multi-TRP operation).

In another embodiment, if a UE is indicated to multiplex a semi-persistent or aperiodic CSI report into a high-priority PUSCH that overlaps with a low priority PUCCH including positive SR information (e.g. eMBB SR) and the UE would transmit on a serving cell the high priority PUSCH without UL-SCH, the UE can perform at least one of the following methods.

According to a first possible method, the UE can transmit the high-priority PUSCH including the semi-persistent or aperiodic CSI report and may not transmit the low priority PUCCH including positive SR. That is, the UE can always prioritize a physical uplink channel that is indicated as higher priority irrespective of an actual content in the physical uplink channel.

According to a second possible method, the UE can transmit the low priority PUCCH including positive SR and may not transmit the high-priority PUSCH without UL-SCH but including the semi-persistent or aperiodic CSI report. That is, the can UE prioritize the SR information over the semi-persistent or aperiodic CSI report irrespective of priorities of corresponding physical channels. Note that the low priority PUCCH may also include eMBB HARQ-ACK in addition to eMBB SR.

According to a third possible method, the UE can multiplex the semi-persistent or aperiodic CSI report and low priority (e.g. eMBB) SR information (additionally eMBB HARQ-ACK information, if included in the low priority PUCCH) into the high-priority PUSCH without UL-SCH and may not transmit the low priority PUCCH. If a network entity explicitly indicates the UE not to include UL-SCH (e.g. an UL-SCH indicator field in DCI format 0_1 of Rel-15 NR is set to 0), the network entity can perform decoding of the semi-persistent or aperiodic CSI report assuming that eMBB SR information (i.e. indication of positive or negative SR) is multiplexed in the high priority PUSCH. If the UE is also due for HARQ-ACK reporting with the overlapping low-priority PUCCH, additionally, the network entity may take into account potential existence of eMBB HARQ-ACK in the high priority PUSCH.

In an example, the UE can determine to apply spatial bundling of eMBB HARQ-ACK in the high priority PUSCH irrespective of harq-ACK-SpatialBundlingPUSCH setting for the high priority PUSCH. In one implementation, spatial bundling of eMBB HARQ-ACK can be done even when the number of layers possible to schedule is equal or less than 4 layers.

In another implementation the eMBB HARQ-ACK information can be multiplexed into the high-priority PUSCH assuming maximum number of Code Block Group (CBG) is up to a certain predetermined number (e.g., 1 or 2). In another implementation the eMBB HARQ-ACK information can be multiplexed into the high-priority PUSCH if the maximum number of CBG is smaller than a certain predetermined number (e.g., 1 or 2).

According to a third possible method, if the UE is indicated to include only the aperiodic CSI report without UL-SCH in the URLLC PUSCH, the UE can consider that the URLLC PUSCH overlapping with the low priority PUCCH configured for eMBB SR and/or eMBB HARQ-ACK is an error case.

If a UE is indicated to multiplex a semi-persistent or aperiodic CSI report into a high-priority PUSCH that overlaps with a low priority PUCCH including eMBB HARQ-ACK information without eMBB SR and the UE would transmit on a serving cell the high priority PUSCH without UL-SCH, the UE performs at least one of the following methods.

According to a first possible method, the UE can transmit the high-priority PUSCH including the semi-persistent or aperiodic CSI report and may not transmit the low priority PUCCH including eMBB HARQ-ACK.

According to a second possible method, the UE can multiplex the semi-persistent or aperiodic CSI report and eMBB HARQ-ACK information into the high-priority PUSCH without UL-SCH and may not transmit the low priority PUCCH.

If the UE would transmit the high priority PUSCH with UL-SCH, the UE may not transmit the low priority PUCCH including SR information (e.g. eMBB SR) and/or eMBB HARQ-ACK.

In other embodiments, a UE can receive information of multiple sets of beta values for UCI multiplexing in a PUSCH, for $\beta_{offset}^{HARQ-ACK}$, $\beta_{offset}^{CSI-part1}$, and $\beta_{offset}^{CSI-part2}$, respectively, and can determine which set of beta values to use based on UCI priority and PUSCH priority, where $\beta_{offset}^{HARQ-ACK}$, $\beta_{offset}^{CSI-part1}$, and $\beta_{offset}^{CSI-part2}$ are parameters used to determine the number of coded modulation symbols per layer within the PUSCH for HARQ-ACK, CSI-part 1, and CSI-part2, respectively, as defined in Subclause 6.3.2.4 (Rate matching) of 3GPP TS38.212. Additionally, $\beta_{offset}^{SR}$ can be defined to determine the number of coded modulation symbols per layer within the PUSCH for SR. A first set of beta values for $\beta_{offset}^{HARQ-ACK}$, $\beta_{offset}^{CSI-part1}$, $\beta_{offset}^{CSI-part2}$, or $\beta_{offset}^{SR}$ can be used for URLLC UCI multiplexing in a low priority PUSCH. A second set of beta values for $\beta_{offset}^{HARQ-ACK}$, $\beta_{offset}^{CSI-part1}$, $\beta_{offset}^{CSI-part2}$, or $\beta_{offset}^{SR}$ can be used for eMBB UCI multiplexing in a high priority PUSCH. A third set of beta values for $\beta_{offset}^{HARQ-ACK}$, $\beta_{offset}^{CSI-part1}$, or $\beta_{offset}^{CSI-part2}$ can be used for eMBB UCI multiplexing in a low priority PUSCH. A fourth set of beta values for $\beta_{offset}^{HARQ-ACK}$, $\beta_{offset}^{CSI-part1}$, or $\beta_{offset}^{CSI-part2}$ is used for URLLC UCI multiplexing in a high priority PUSCH. In one example, a network entity can configure the UE with larger values for the first set of beta values and with smaller values for the second set of beta values, in order to ensure provision of more resource elements for URLLC UCI and URLLC UL-SCH, respectively.

In one implementation, one or more of the sets of beta values can be different for different number of URLLC/high priority PUSCH repetitions. In another implementation, one or more of the sets of beta values can be different for different number of URLLC/high priority PUSCH symbols/REs.

In other embodiments, if a UE does not have high priority data to transmit on a high priority PUSCH but has low priority data associated with a certain logical channel and the high priority PUSCH satisfies configured mapping restrictions of logical channel prioritization procedure for the logical channel, the UE can transmit the high priority PUSCH with low priority data. In this case, at the UE, the MAC can indicate to the PHY that a delivered TB to PHY is actually lower priority data so that PHY can multiplex eMBB UCI on the high priority PUSCH carrying the low priority data (assuming that eMBB UCI is not allowed to be multiplexed on PUSCH carrying URLLC (i.e. high priority) data to guarantee the reliability of URLLC data delivery). Further, the UE may need to indicate to a network entity that the high priority PUSCH carries lower priority data. With that indication, a network entity (e.g. gNB) can expect that eMBB UCI is multiplexed in the high priority PUSCH and can properly determine a first set of resource elements associated with the TB in the PUSCH and a second set of resource elements associated with the eMBB UCI. In one example, the UE can make an indication of low or high priority UL-SCH in the high PUSCH by using a different scrambling sequence for UL-SCH. Alternatively or additionally, the gNB can perform decoding twice with hypotheses with and without eMBB UCI being multiplexed.

In other embodiments, if a high priority PUSCH with low priority UL-SCH overlaps with a high priority PUCCH including positive SR on a serving cell, the UE may not transmit the high priority PUSCH. If the UE is configured to be able to skip UL grant and an aperiodic CSI report is not triggered, gNB would anyway blindly detect transmissions of the high priority PUSCH and the high priority PUCCH. If a high priority PUCCH carrying URLLC HARQ-ACK information but not including URLLC SR information overlaps in time with a high priority PUSCH with low priority UL-SCH and one or more timing conditions (if applicable) for multiplexing are satisfied, the UE can multiplex the URLLC HARQ-ACK information in the high priority PUSCH with low priority UL-SCH and may not transmit the high priority PUCCH.

In other embodiments, if a UE is indicated with a first PUCCH and a second PUCCH for eMBB HARQ-ACK, where the first PUCCH starts earlier than the second PUCCH, and the first PUCCH overlaps with a high priority PUCCH including URLLC SR and/or URLLC HARQ-ACK, the UE can transmit the eMBB HARQ-ACK on the second PUCCH that does not overlap with the high priority PUCCH.

In other embodiments, if a newly received UL grant without a high priority indication (or with a low priority indication) overlaps with a high priority physical channel and the timeline requirements for overlapping channels (as described in Subclause 9.2.5 of TS38.213) are not met, PHY may not deliver the UL grant to MAC layer of the UE.

In one embodiment, PHY of a UE can consider a first PUCCH resource configured in a first SR resource configuration (e.g. in the RRC parameter SchedulingRequestResourceConfig) being set as a high priority, if a first SR configuration (e.g. the RRC parameter SchedulingRequestConfig) associated with the first SR resource configuration corresponds to a logical channel with high priority, e.g. the logical channel with priority value of '1', where an increasing priority value among the priority values of {1, 2, 3, . . . , 16} indicates a lower priority level. The PHY of the UE can consider a second PUCCH resource configured in a second SR resource configuration being set as a low priority, if a second SR configuration associated with the second SR resource configuration corresponds only to one or more logical channels with low priority (e.g. with priority values of 2, 3, . . . , or 16).

In another embodiment, the priority level of a PUCCH resource configured in a SR resource configuration can be based on (e.g., same as) the highest priority logical channel corresponding to (or mapped to) the SR resource configuration. For example, if logical channels with priority value 1, 2, 3 respectively corresponding to a first SR configuration with a first PUCCH resource, the priority level of the first PUCCH resource can be '1', which corresponds to the highest priority level '1' (out of level '1', '2', '3') of the logical channel corresponding to the first SR configuration. Logical channels with priority value 5, 6, 7 respectively corresponding to a second SR configuration with a second PUCCH resource, the priority level of the second PUCCH resource can be '5', which corresponds to the highest priority level '5' (out of level '5', '6', '7') of the logical channel corresponding to the second SR configuration. The second PUCCH resource with priority level '5' has lower priority than the first PUCCH resource with priority level '1'.

Table 2 shows exemplary collision handling rules for UCI and UL data.

TABLE 2

Exemplary collision handling rules for UCI and UL data

| | URLLC SR | URLLC HARQ-ACK | CSI | URLLC PUSCH |
|---|---|---|---|---|
| URLLC SR | | | | |
| URLLC HARQ-ACK | Reuse Rel-15 rule | | | |
| CSI | If a PUCCH resource for CSI is configured as a high priority PUCCH, CSI and URLLC SR can be multiplexed in a high priority PUCCH which ends no later than a high priority PUCCH resource for URLLC SR. If a PUCCH resource for CSI is configured as a low priority PUCCH, drop CSI. | If a PUCCH resource for CSI is configured as a high priority PUCCH, CSI and URLLC HARQ-ACK can be multiplexed in a high priority PUCCH which ends no later than a high priority PUCCH resource for URLLC HARQ-ACK. If a PUCCH resource for CSI is configured as a low priority PUCCH, drop CSI. | | |
| URLLC PUSCH | Reuse Rel-15 rule | Reuse Rel-15 rule | If a PUCCH resource for CSI is configured as a high priority PUCCH and a UE does not multiplex A-CSI or SP-CSI in a URLLC PUSCH, the UE multiplexes the CSI in the URLLC PUSCH. If the PUCCH resource for the CSI is configured as a low priority PUCCH or if the UE multiplexes A-CSI or SP-CSI in the URLLC PUSCH, drop the CSI. | |
| eMBB SR | Drop eMBB SR | Drop eMBB SR | If a PUCCH resource for CSI is configured as a high priority PUCCH, consider it as an error case. If a PUCCH resource for CSI is configured as a low priority PUCCH, reuse Rel-15 rule. | If URLLC PUSCH including A-CSI or SP-CSI does not include UL-SCH, multiplex eMBB SR (i.e. indication of positive or negative SR) in the URLLC PUSCH. For other cases, drop eMBB SR. |
| eMBB HARQ-ACK | Drop eMBB HARQ-ACK | Drop eMBB HARQ-ACK | If a PUCCH resource for CSI is configured as a high priority PUCCH, consider it as an error case. If a PUCCH resource for CSI is configured as a low priority PUCCH, reuse Rel-15 rule. | If URLLC PUSCH including A-CSI or SP-CSI does not include UL-SCH or if URLLC PUSCH includes eMBB UL-SCH, multiplex eMBB HARQ-ACK. For other cases, drop eMBB HARQ-ACK. |

TABLE 2-continued

Exemplary collision handling rules for UCI and UL data

| | URLLC SR | URLLC HARQ-ACK | CSI | URLLC PUSCH |
|---|---|---|---|---|
| eMBB PUSCH | Drop eMBB PUSCH, if at least one URLLC SR overlapping with the eMBB PUSCH is positive SR. Otherwise, transmit eMBB PUSCH. | Drop eMBB PUSCH (since MCS of eMBB PUSCH may not be suitable for URLLC HARQ-ACK transmission) Alternatively, multiplex URLLC HARQ-ACK in eMBB PUSCH by using a large beta value for HARQ-ACK | If a PUCCH resource for CSI is configured as a high priority PUCCH, consider it as an error case. If a PUCCH resource for CSI is configured as a low priority PUCCH, reuse Rel-15 rule. | Drop eMBB PUSCH |

At least some embodiments can provide for handling of multiple unicast data channels associated with different traffic types. If a UE has to handle more than one unicast PDSCH at a given time (for overlapping or non-overlapping unicast PDSCHs), it can be useful to guarantee UE processing pipelining (i.e. one processing block is used for processing of one physical channel at a time) while guaranteeing that all physical channels can meet their processing timeline.

In one implementation, a minimum processing time of PDSCHs at the UE can be determined based on a use case/traffic type. For example, longer minimum PDSCH processing time (e.g. PDSCH processing time shown in Table 5.3-1 of TS38.214) can be applied to a PDSCH carrying eMBB traffics and/or a PDSCH with a number of symbols larger than a certain threshold value (e.g. the number of symbols is larger than 4), while shorter minimum PDSCH processing time (e.g. PDSCH processing time shown in Table 5.3-2 of TS38.214) can be allowed for a PDSCH carrying URLLC traffics and/or a PDSCH with a number of symbols less than the threshold value. If traffic-specific (or service-specific) minimum PDSCH processing times are allowed in a given serving cell for the UE, the PDSCH to HARQ-ACK feedback can be out-of-order or in-order depending on respective traffic types of a first PDSCH and a second PDSCH. The out-of-order PDSCH to HARQ-ACK feedback is that the HARQ-ACK associated with a second PDSCH with HARQ process ID 'x' received after a first PDSCH with HARQ process ID 'y' can be sent before the HARQ-ACK of the first PDSCH. The in-order PDSCH to HARQ-ACK feedback is that the HARQ-ACK associated with a second PDSCH with HARQ process ID 'x' received after a first PDSCH with HARQ process ID 'y' is sent after the HARQ-ACK of the first PDSCH. In another implementation, the UE can be configured with one minimum processing time in a given serving cell for all traffic types.

In order to guarantee UE processing pipelining for the above mentioned UE processing time implementations, the UE may have to buffer received symbols of a PDSCH (and/or the demodulated data, i.e. Log Likelihood Ratios (LLRs)) and/or corresponding HARQ-ACK feedback information and also postpone decoding of the received PDSCH and/or transmission of HARQ-ACK feedback. If the UE postpones decoding the received PDSCH and/or delays transmitting the corresponding HARQ-ACK feedback compared to originally indicated HARQ-ACK transmission time in order to process a later received PDSCH with higher priority, a new PUCCH resource may need to be provided to the UE for delayed HARQ-ACK feedback transmission.

Figure 2:
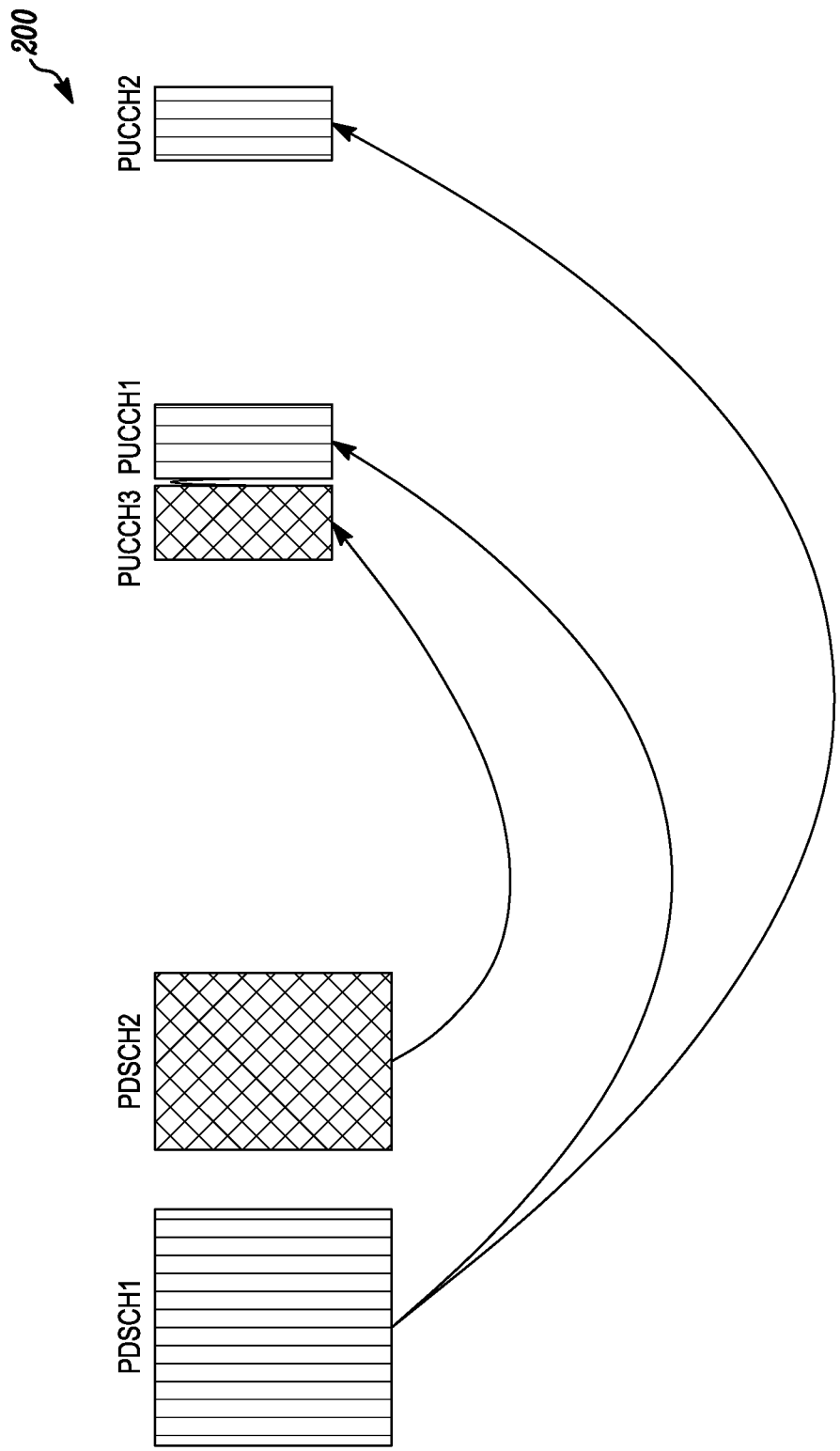
FIG. 2 is an example illustration of an example scenario that requires the UE to handle two unicast Physical Downlink Shared Channels (PDSCHs) according to a possible embodiment.

FIG. 2 is an example illustration 200 of an example scenario that requires the UE to handle two unicast PDSCHs according to a possible embodiment. A UE can receive first information of a dynamic or semi-persistent DL assignment for a first PDSCH of a serving cell and can identify first and second PUCCH resources and/or a first and second PDSCH-to-HARQ-timing indication values associated with the first and second PUCCH resources, respectively, for HARQ-ACK feedback of the first PDSCH. Further, the UE can receive second information of a dynamic or semi-persistent DL assignment for a second PDSCH of the serving cell, where a starting symbol of the second PDSCH is later than a starting symbol of the first PDSCH, and can determine whether to delay the HARQ-ACK feedback of the first PDSCH for processing of the second PDSCH. In response to determining to delay the HARQ-ACK feedback of the first PDSCH, the UE can transmit the HARQ-ACK feedback of the first PDSCH on the second PUCCH resource. In response to determining not to delay the HARQ-ACK feedback of the first PDSCH, the UE can transmit the HARQ-ACK feedback of the first PDSCH on the first PUCCH resource. In one implementation, the second PDSCH can be explicitly indicated as a high-priority PDSCH.

The first PUCCH resource can start earlier than the second PUCCH resource, and the first PDSCH-to-HARQ-timing indication value $k_1$ may not be greater than the second PDSCH-to-HARQ-timing indication value $k_2$. In one example, for PDSCH reception ending in slot n, the UE can transmit the first or second PUCCH in slot n+$k_i$ where $k_i$ (i=1, 2) is in a unit of slot and can be provided by DCI and/or can be higher-layer configured. In another example, for sub-slot based HARQ-ACK feedback, the UE can transmit the first or second PUCCH for HARQ-ACK feedback in sub-slot n+$k_i$ in response to PDSCH reception ending in sub-slot n, where $k_i$ (i=1, 2) is in a unit of sub-slot.

In one implementation, the first and second PUCCH resources (e.g. as PUCCH resource indices) and the associated first and second PDSCH-to-HARQ-timing indication values can be explicitly indicated via RRC signaling and/or DCI signaling. For example, each element of a PUCCH resource set can consist of or include one or more PUCCH resource indices and accordingly, a codepoint of a PUCCH Resource Indicator (PRI) field in DCI can indicate one or more PUCCH resources. Furthermore, each element of the higher-layer parameter 'dl-DataToUL-ACK' for a set of number of slots (or a set of number of sub-slots) can consist of or include one or more values for number of slots (or sub-slots), and a codepoint of a PDSCH-to-HARQ-timing-indicator field in DCI can indicate one or more values for the number of slots (or sub-slots).

In another implementation, the first PUCCH resource and the associated first PDSCH-to-HARQ-timing indication value can be explicitly indicated via RRC signaling and/or DCI signalling scheduling the first PDSCH. The RRC signaling or DCI scheduling the second PDSCH can include the second PUCCH resource and the associated second PDSCH-to-HARQ-timing indication value for HARQ-ACK feedback of the first PDSCH.

In another implementation, the UE can receive explicit indication of the first PUCCH resource and/or the associated first PDSCH-to-HARQ-timing indication value via RRC and/or DCI signaling, and can derive the second PUCCH resource and/or the second PDSCH-to-HARQ-timing indication value based on the first PUCCH resource and/or the first PDSCH-to-HARQ-timing indication value. In one example, an offset value of the second PDSCH-to-HARQ-timing indication value with respect to the first PDSCH-to-HARQ-timing indication value can be higher-layer configured, dynamically signaled, or pre-determined, and a PUCCH resource index of the second PUCCH resource can be the same as a PUCCH resource index of the first PUCCH resource. In another example, the UE can determine the second PDSCH-to-HARQ-timing indication value by applying an offset value in terms of a number of slots (or a number of sub-slots) with respect to a slot (or a sub-slot) where the second PDSCH ends (or where the second PDSCH starts). The offset value can be higher-layer configured, dynamically signaled, or pre-determined, and a PUCCH resource index of the second PUCCH resource can be the same as a PUCCH resource index of the first PUCCH resource. The offset value may be dependent on the minimum processing time for the second PDSCH.

If decoding of the first PDSCH (possibly, a PDSCH with low priority, e.g. the PDSCH carrying eMBB traffic) needs to be postponed according to a predefined or configured condition(s), the UE can transmit the corresponding HARQ-ACK on the second PUCCH resource with the second PDSCH-to-HARQ timing value. Otherwise, the UE can transmit the corresponding HARQ-ACK on the first PUCCH resource with the first PDSCH-to-HARQ timing value.

The UE can process both the first and second PDSCHs under some conditions such as scheduling conditions and/or reported UE capability information. The scheduling conditions can include at least one of the number of RBs, a Transport Block Size (TBS), the number of layers, a time gap between the first and second PDSCHs, and a time gap between two PUCCHs carrying HARQ-ACK of the first and second PDSCHs. The exemplary UE capability information can include the number of high priority PDSCHs and the number of low priority PDSCHs that the UE can handle on a given band of a band combination. If received scheduling information of the first and second PDSCHs does not meet those conditions, the UE can postpone or skip decoding of the first PDSCH.

One exemplary condition of postponing the first PDSCH decoding can be that a time difference between an end of the first PDSCH of low-priority and a start of the second PDSCH of high-priority is less than a minimum processing time for the low-priority first PDSCH (i.e. the PDSCH that starts earlier). In other words, the UE can process both the low priority and the high priority PDSCHs and report the HARQ-ACK feedback of the low priority PDSCH on the first PUCCH resource (i.e. a PUCCH resource that starts earlier), if the time gap between the first symbol of the high priority PDSCH and the last symbol of the low priority PDSCH comprises at least N1 symbols. N1 can be the minimum processing time of the low priority PDSCH or a configured or pre-defined value. Otherwise, the UE can postpone or skip decoding the low priority PDSCH. If the UE is provided with the first and second PUCCH resources for HARQ-ACK feedback of the low priority PDSCH (i.e. the first PDSCH), the can UE postpone decoding the low priority PDSCH and can transmit HARQ-ACK feedback of the low priority PDSCH on the second PUCCH resource (i.e. a PUCCH resource that starts later). If the UE is provided with only one PUCCH resource (i.e. the first PUCCH resource) for HARQ-ACK feedback of the low priority PDSCH, the UE can skip decoding the low priority PDSCH and can transmit HARQ-ACK feedback of the low priority PDSCH on the first PUCCH resource. If decoding of the low priority PDSCH is skipped, the UE can generate NACK as the HARQ-ACK feedback.

In one implementation, the first and second PUCCH resources are in a same serving cell (e.g. a PCell, a PSCell, or a PUCCH-SCell). The PCell can be a primary cell of a Master Cell Group (MCG). The PSCell can be a primary cell of a Secondary Cell Group (SCG) when the UE is configured with dual-connectivity. The PUCCH-SCell can be a secondary cell that has an uplink carrier configured to carry PUCCH. In another implementation, if the UE is configured with a PUCCH-SCell, the first and second PUCCH resources can be either in the same serving cell or in different serving cells.

In another embodiment, if a UE determines, according to one or more configured or predefined rules, to delay or skip decoding a first PDSCH and transmitting HARQ-ACK feedback of the first PDSCH on a first PUCCH resource for processing of a second PDSCH and would transmit the HARQ-ACK feedback of the first PDSCH on a second PUCCH resource, the UE can maintain an original size of HARQ-ACK codebook for HARQ-ACK transmission on the first PUCCH taking into account a HARQ-ACK bit field associated with the first PDSCH. That is, the HARQ-ACK codebook size for the first PUCCH in response to determining to delay or skip HARQ-ACK feedback of the first PDSCH can be same as the HARQ-ACK codebook size in response to determining not to delay or skip HARQ-ACK feedback of the first PDSCH. The first PDSCH can be potentially a lower-priority PDSCH than the second PDSCH, and the first PDSCH can start earlier than the second PDSCH.

In the HARQ-ACK codebook of the first PUCCH, the UE can set a HARQ-ACK bit field(s) associated with the first PDSCH as a known value(s), e.g. NACK or ACK. In the HARQ-ACK codebook of the second PUCCH, the UE can append the HARQ-ACK information bit(s) of the first PDSCH at the end of the HARQ-ACK codebook of the second PUCCH.

In one embodiment, a physical layer of a UE can indicate a MAC entity, whether to attempt to decode received data (e.g. LLRs of channel bits). If the UE decides to skip decoding of a first PDSCH due to processing of a second PDSCH, where the first PDSCH has lower priority than the second PDSCH, the PHY can indicate the MAC not to attempt to decode the received data. Furthermore, the UE can decide whether to replace the data in the soft buffer for this TB with the received data, depending on the timing condition (whether UE was able to perform demodulation or not).

If the UE decides to skip decoding of the first PDSCH, in one implementation, the UE can invalidate the detected DCI format for the first PDSCH. In another implementation, if the UE has already generated useful/meaningful LLRs for some or all of channel bits (even though UE does not proceed decoding), then it may be better to use them rather than completely discarding them. Thus, whether to update the soft buffer or not for the first PDSCH that decoding is skipped can be left up to UE implementation.

According to a possible embodiment, HARQ process can be modified as follows, where double dashes, "--" indicates additions:

5.3.2.2 HARQ Process

When a transmission takes place for the HARQ process, one or two (in case of downlink spatial multiplexing) TBs and the associated HARQ information are received from the HARQ entity.

For each received TB and associated HARQ information, the HARQ process shall:
1> if the NDI, when provided, has been toggled compared to the value of the previous received transmission corresponding to this TB; or
1> if the HARQ process is equal to the broadcast process, and this is the first received transmission for the TB according to the system information schedule indicated by RRC; or
1> if this is the very first received transmission for this TB (i.e. there is no previous NDI for this TB):
  2> consider this transmission to be a new transmission.
1> else:
  2> consider this transmission to be a retransmission.
The MAC entity then shall:
1> if this is a new transmission:
  2> if the physical layer indicates the MAC entity to attempt to decode the received data:
    3> attempt to decode the received data.
1> else if this is a retransmission:
  2> if the data for this TB has not yet been successfully decoded:
    3> instruct the physical layer to combine the received data with the data currently in the soft buffer for this TB
    3> if the physical layer indicates the MAC entity to attempt to decode the received data:
      4> attempt to decode the combined data.
1> if the data which the MAC entity attempted to decode was successfully decoded for this TB; or
1> if the data for this TB was successfully decoded before:
  2> if the HARQ process is equal to the broadcast process:
    3> deliver the decoded MAC PDU to upper layers.
  2> else if this is the first successful decoding of the data for this TB:
    3> deliver the decoded MAC PDU to the disassembly and demultiplexing entity.
1> else if the physical layer indicates the MAC entity to attempt to decode the received data:
  2> instruct the physical layer to replace the data in the soft buffer for this TB with the data which the MAC entity attempted to decode.
1> if the HARQ process is associated with a transmission indicated with a Temporary C-RNTI and the Contention Resolution is not yet successful (see subclause 5.1.5); or
1> if the HARQ process is equal to the broadcast process; or
1> if the timeAlignmentTimer, associated with the TAG containing the Serving Cell on which the HARQ feedback is to be transmitted, is stopped or expired:
  2> not instruct the physical layer to generate acknowledgement(s) of the data in this TB.
1> else:
  2> instruct the physical layer to generate acknowledgement(s) of the data in this TB.

The MAC entity shall ignore NDI received in all downlink assignments on PDCCH for its Temporary C-RNTI when determining if NDI on PDCCH for its C-RNTI has been toggled compared to the value in the previous transmission.

NOTE: If the MAC entity receives a retransmission with a TB size different from the last TB size signalled for this TB, the UE behavior is left up to UE implementation.

Figure 3:
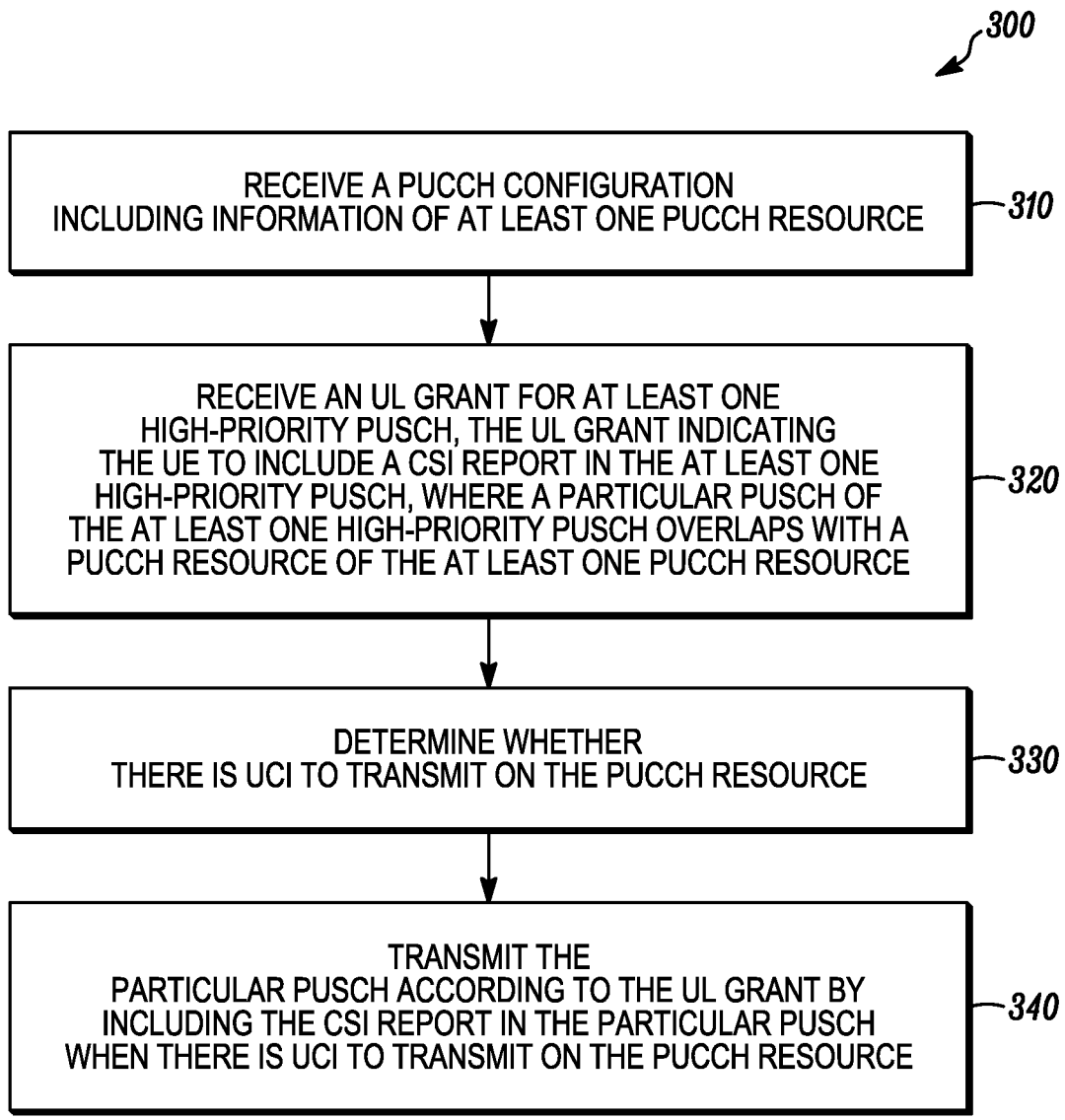
FIG. 3 is an example flowchart illustrating the operation of an apparatus according to a possible embodiment.

NOTE: If the physical layer indicates the MAC entity not to attempt to decode the received data, it is up to UE whether to instruct the physical layer to replace the data in the soft buffer for this TB with the received data FIG. 3 is an example flowchart 300 illustrating the operation of a wireless communication device, such as the UE 110, according to a possible embodiment. At 310, a PUCCH configuration including information of at least one PUCCH resource can be received. At 320, an UL grant for at least one high-priority PUSCH can be received. The UL grant can indicate the UE to include a CSI report in the at least one high-priority PUSCH. A particular PUSCH of the at least one high-priority PUSCH can overlap with a PUCCH resource of the at least one PUCCH resource. At 330, a determination can be made as to whether there is UCI to transmit on the PUCCH resource. At 340, the particular PUSCH can be transmitted according to the UL grant by including the CSI report in the particular PUSCH when there is UCI to transmit on the PUCCH resource.

According to a possible embodiment, a UCI transmission on the PUCCH resource can be cancelled.

According to a possible embodiment, a determination can be made as to whether there is UL-SCH for the PUSCH. The UCI can include at least a SR. The PUCCH resource can be a low-priority PUCCH resource. Transmitting the PUSCH can include transmitting the PUSCH without including the UCI when there is no UL-SCH for the PUSCH. For example, if a UE has a SR only or a SR and HARQ-ACK information to transmit on the PUCCH resource and the PUCCH resource is a low priority PUCCH resource, the UE can transmit the high-priority PUSCH according to the UL grant regardless of whether there is UL-SCH or not. The UL-SCH can be, such as can include, user data.

According to a possible embodiment, a determination can be made as to whether the UCI includes a SR and/or HARQ-ACK information. The UCI can be multiplexed into the transmitted PUSCH when the UCI includes the SR and/or HARQ-ACK information. The PUCCH resource can be a low-priority PUCCH resource. For example, the UE can multiplex the semi-persistent or aperiodic CSI report and low priority SR information (as well as eMBB HARQ-ACK information, if included in the low priority PUCCH) into the high-priority PUSCH without UL-SCH and may not transmit the low priority PUCCH.

According to a possible implementation, the CSI report can be a first CSI report. The UCI can include a second CSI report. Multiplexing the UCI can include multiplexing the UCI excluding the second CSI report into the transmitted PUSCH.

According to a possible implementation, a determination can be made as to whether there is UL-SCH for the PUSCH. Multiplexing can include multiplexing the SR and/or HARQ-ACK information into the transmitted PUSCH when there is no UL-SCH for the PUSCH.

According to a possible embodiment, the CSI report can be an aperiodic CSI report in the at least one high-priority PUSCH.

According to a possible embodiment, the CSI report can be a semi-persistent CSI report. The at least one high-priority PUSCH can include semi-persistently occurring PUSCH resources. Transmitting can include transmitting the CSI report on a semi-persistently occurring PUSCH resource of the semi-persistently occurring PUSCH resources.

According to a possible embodiment, the PUCCH resource can correspond to a high priority PUCCH. Transmitting the PUSCH can include transmitting the PUSCH when the PUCCH resource corresponds to the high priority PUCCH.

According to a possible implementation, the transmitted PUSCH can include UL-SCH. Transmitting the PUSCH can include transmitting the PUSCH when the PUSCH includes the UL-SCH and the PUCCH resource corresponds to the high priority PUCCH. According to a possible implementation, the CSI report can be a first CSI report. The UCI can be a SR, HARQ-ACK information and/or a second CSI report. Transmitting the PUSCH can include multiplexing the HARQ-ACK information into the PUSCH if the UCI includes the HARQ-ACK information, excluding the SR from the PUSCH when the UCI includes the SR, and excluding the second CSI report from the PUSCH when the UCI includes the second CSI report.

For example, if a high priority PUCCH carrying URLLC HARQ-ACK information, URLLC SR, and/or a URLLC CSI report overlaps in time with a high priority PUSCH with UL-SCH and one or more timing conditions for multiplexing are satisfied, the UE can multiplex the URLLC HARQ-ACK information and/or the URLLC CSI report in the high priority PUSCH with UL-SCH and may not transmit the high priority PUCCH including URLLC SR. One example of the URLLC CSI report can be an indication of CQI offset/adjustment that would be transmitted on the high priority PUCCH together with URLLC HARQ-ACK. Furthermore, if the UE is indicated to send a semi-persistent or aperiodic CSI report in the high priority PUSCH with UL-SCH, the UE can multiplex only the URLLC HARQ-ACK information in the high priority PUSCH and may not multiplex the URLLC CSI report that would be transmitted on the high priority PUCCH. This can be because the semi-persistent or aperiodic CSI report that is triggered by a network entity and would be transmitted on the high priority PUSCH may include more important CSI than the URLLC CSI report that would be transmitted on the high priority PUCCH. If the high priority PUCCH resource overlaps in time with multiple high priority PUSCHs that satisfy timing conditions for UCI multiplexing, a high priority PUSCH that carries aperiodic CSI can be selected for UCI multiplexing. If there is no high priority PUSCH carrying aperiodic CSI, a high priority PUSCH that is scheduled by a dynamic UL grant, is in a serving cell with the smallest ServCellIndex, and starts earlier in a given serving cell is selected for UCI multiplexing.

According to a possible embodiment, the UCI can include at least HARQ-ACK information. The particular PUSCH can be transmitted by including low priority UL-SCH and the HARQ-ACK information of the UCI on the particular PUSCH. According to a possible implementation, an indication can be sent indicating that the low-priority UL-SCH is transmitted on the particular PUSCH. According to a possible implementation, indicating can include indicating by applying a scrambling sequence to the particular PUSCH, where the scrambling sequence corresponds to the low-priority UL-SCH. For example, different scrambling sequences can be used to indicate different priorities of the UL-SCH.

According to a possible embodiment, the PUCCH configuration can include a SR resource configuration. The SR resource configuration can include the PUCCH resource and can be associated with a SR configuration. The SR configuration can correspond to at least one logical channel. The method can include determining a priority of the PUCCH resource based on at least one priority of the at least one logical channel.

For example, each logical channel can have one priority, the SR configuration can correspond to multiple logical channel priorities, and priority of the PUCCH can be determined based on the multiple logical channel priorities. PHY of a UE can consider a first PUCCH resource configured in a first SR resource configuration (e.g. in the RRC parameter SchedulingRequestResourceConfig) being set as a high priority, if a first SR configuration (e.g. the RRC parameter SchedulingRequestConfig) associated with the first SR resource configuration corresponds to a logical channel with high priority, e.g. the logical channel with priority value of '1', where an increasing priority value among the priority values of $\{1, 2, 3, \ldots, 16\}$ can indicate a lower priority level. The PHY of the UE can consider a second PUCCH resource configured in a second SR resource configuration being set as a low priority, if a second SR configuration associated with the second SR resource configuration corresponds only to one or more logical channels with low priority (e.g. with priority values of 2, 3, . . . , or 16).

Figure 4:
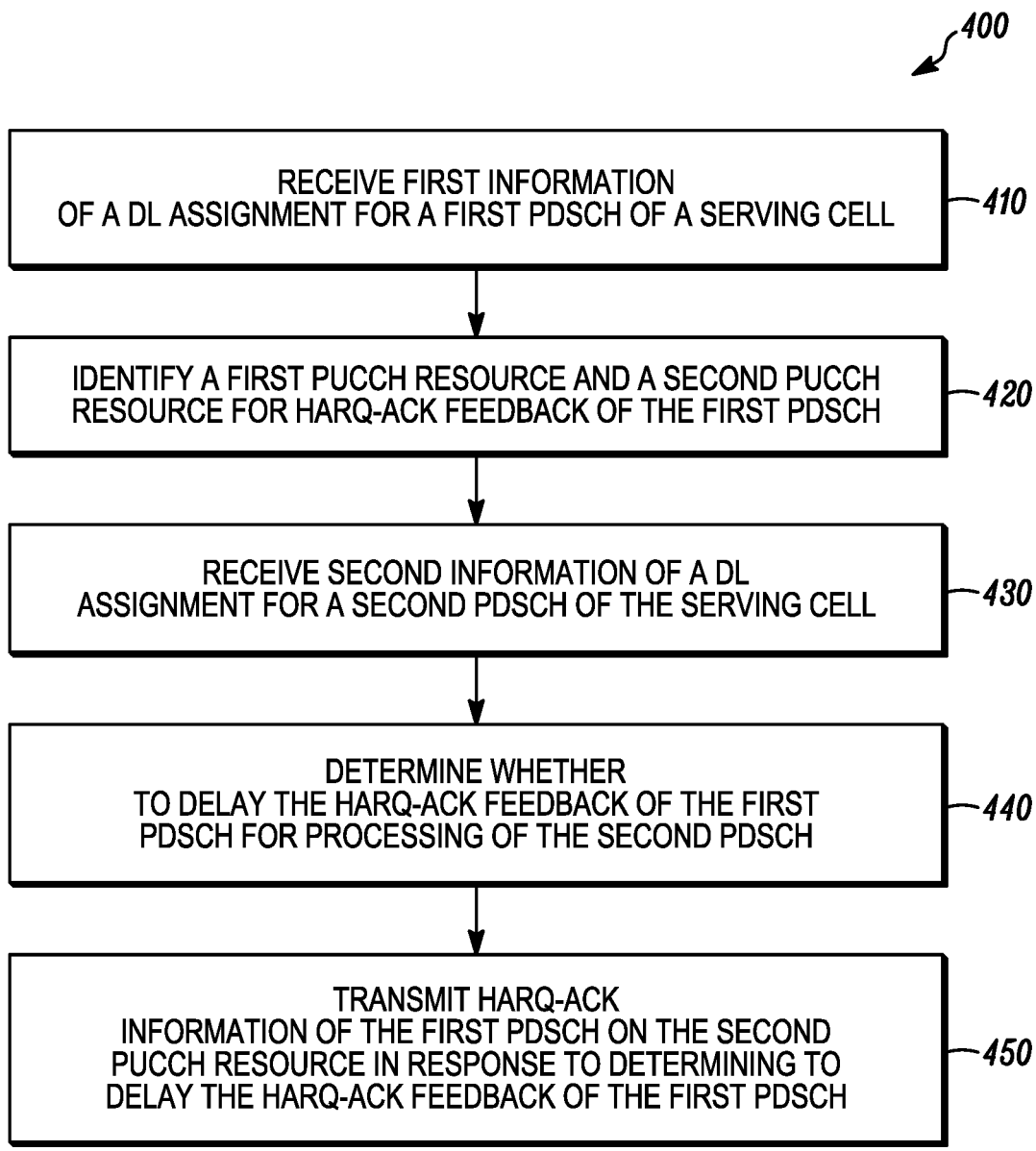
FIG. 4 is an example flowchart illustrating the operation of an apparatus according to a possible embodiment.

FIG. 4 is an example flowchart 400 illustrating the operation of a wireless communication device, such as the UE 110, according to a possible embodiment. At 410, first information of a DL assignment for a first PDSCH of a serving cell can be received. At 420, a first PUCCH resource and a second PUCCH resource can be identified for HARQ-ACK feedback of the first PDSCH. A starting symbol of the second PUCCH resource can be later than a starting symbol of the first PUCCH resource. At 430, second information of a DL assignment for a second PDSCH of the serving cell can be received. A starting symbol of the second PDSCH can be later than a starting symbol of the first PDSCH. At 440, a determination can be made as to whether to delay the HARQ-ACK feedback of the first PDSCH for processing of the second PDSCH. At 450, HARQ-ACK information of the first PDSCH can be transmitted on the second PUCCH resource in response to determining to delay the HARQ-ACK feedback of the first PDSCH.

According to a possible embodiment, the first PDSCH can be associated with a lower-priority than the second PDSCH.

According to a possible embodiment, the first PUCCH resource can be determined based on a first PUCCH resource index and a first PDSCH-to-HARQ-timing indication value. The second PUCCH resource can be determined based on a second PUCCH resource index and a second PDSCH-to-HARQ-timing indication value.

According to a possible embodiment, HARQ-ACK information of the second PDSCH can be transmitted on a third PUCCH resource. A starting symbol of the third PUCCH resource can be earlier than a starting symbol of the first PUCCH resource. For example, as shown in the illustration 200, PUCCH3 can start earlier than PUCCH1.

According to a possible embodiment, the HARQ-ACK information of the first PDSCH can be transmitted on the first PUCCH resource in response to determining not to delay the HARQ-ACK feedback of the first PDSCH.

According to a possible embodiment, a first HARQ-ACK codebook can be transmitted on the first PUCCH resource and a second HARQ-ACK codebook can be transmitted on the second PUCCH resource in response to determining to delay the HARQ-ACK feedback of the first PDSCH. The HARQ-ACK information of the first PDSCH can be included in the second HARQ-ACK codebook. According to a possible implementation, the HARQ-ACK information of the first PDSCH can be appended to other HARQ-ACK information of the second HARQ-ACK codebook. According to a possible implementation, the first HARQ-ACK codebook can include a bit field for the HARQ-ACK feedback of the first PDSCH. According to a possible implementation, the bit field for the HARQ-ACK feedback of the first PDSCH can include one or more known values. According to a possible implementation, a width of the bit field for the HARQ-ACK feedback of the first PDSCH can be the same size as a size of the HARQ-ACK information of the first PDSCH.

According to a possible embodiment, the first and second PUCCH resources can be in a same cell. According to a possible embodiment, the first and second PUCCH resources can be in different cells.

According to a possible embodiment, the DL assignment of the first PDSCH can be a dynamic or semi-persistent assignment.

According to a possible embodiment, the first PUCCH resource can overlap with a PUCCH including URLLC SR information and/or URLLC HARQ-ACK information. The second PUCCH resource may not overlap with the PUCCH. The HARQ-ACK information of the first PDSCH can be transmitted on the second PUCCH resource.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments. Additionally, a network entity, such as a base station, transmission and reception point, or other network entity, can perform reciprocal operations of a UE. For example, the network entity can transmit signals received by the UE and can receive signals transmitted by the UE. The network entity can also process and operate on sent and received signals.

Figure 5:
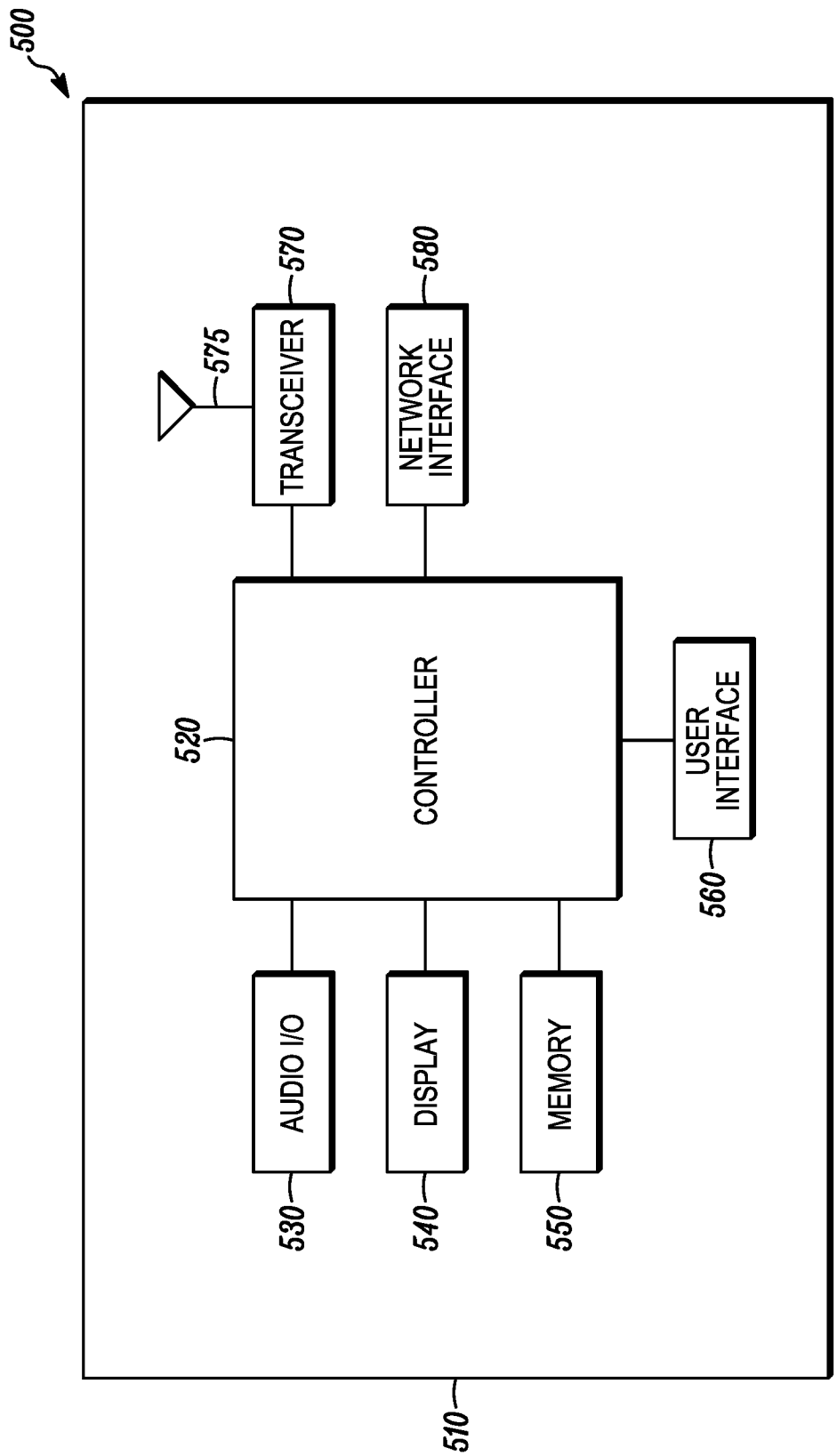
FIG. 5 is an example block diagram of an apparatus according to a possible embodiment.

FIG. 5 is an example block diagram of an apparatus 500, such as the UE 110, the network entity 120, or any other wireless communication device disclosed herein, according to a possible embodiment. The apparatus 500 can include a housing 510, a controller 520 coupled to the housing 510, audio input and output circuitry 530 coupled to the controller 520, a display 540 coupled to the controller 520, a memory 550 coupled to the controller 520, a user interface 560 coupled to the controller 520, a transceiver 570 coupled to the controller 520, at least one antenna 575 coupled to the transceiver 570, and a network interface 580 coupled to the controller 520. The apparatus 500 may not necessarily include all of the illustrated elements for different embodiments of the present disclosure. The apparatus 500 can perform the methods described in all the embodiments.

The display 540 can be a viewfinder, a Liquid Crystal Display (LCD), a Light Emitting Diode (LED) display, an Organic Light Emitting Diode (OLED) display, a plasma display, a projection display, a touch screen, or any other device that displays information. The transceiver 570 can be one or more transceivers that can include a transmitter and/or a receiver. The audio input and output circuitry 530 can include a microphone, a speaker, a transducer, or any other audio input and output circuitry. The user interface 560 can include a keypad, a keyboard, buttons, a touch pad, a joystick, a touch screen display, another additional display, or any other device useful for providing an interface between a user and an electronic device. The network interface 580 can be a Universal Serial Bus (USB) port, an Ethernet port, an infrared transmitter/receiver, an IEEE 1394 port, a wireless transceiver, a WLAN transceiver, or any other interface that can connect an apparatus to a network, device, and/or computer and that can transmit and receive data communication signals. The memory 550 can include a Random-Access Memory (RAM), a Read Only Memory (ROM), an optical memory, a solid-state memory, a flash memory, a removable memory, a hard drive, a cache, or any other memory that can be coupled to an apparatus.

The apparatus 500 or the controller 520 may implement any operating system, such as Microsoft Windows®, UNIX®, LINUX®, Android™, or any other operating system. Apparatus operation software may be written in any programming language, such as C, C++, Java, or Visual Basic, for example. Apparatus software may also run on an application framework, such as, for example, a Java® framework, a .NET® framework, or any other application framework. The software and/or the operating system may be stored in the memory 550, elsewhere on the apparatus 500, in cloud storage, and/or anywhere else that can store software and/or an operating system. The apparatus 500 or the controller 520 may also use hardware to implement disclosed operations. For example, the controller 520 may be any programmable processor. Furthermore, the controller 520 may perform some or all of the disclosed operations. For example, at least some operations can be performed using cloud computing and the controller 520 may perform other operations. At least some operations can also be performed computer executable instructions executed by at least one computer processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 520 may be any controller or processor device or devices capable of operating an apparatus and implementing the disclosed embodiments. Some or all of the additional elements of the apparatus 500 can also perform some or all of the operations of the disclosed embodiments.

In operation, the apparatus 500 can perform the methods and operations of the disclosed embodiments. The transceiver 570 can transmit and receive signals, including data signals and control signals that can include respective data and control information. The controller 520 can generate and process the transmitted and received signals and information.

According to a possible embodiment, the transceiver 570 can receive a PUCCH configuration including information of at least one PUCCH resource. The transceiver 570 can receive an UL grant for at least one high-priority PUSCH. The UL grant can indicate the UE to include a CSI report in the at least one high-priority PUSCH. A particular PUSCH of the at least one high-priority PUSCH can overlap with a PUCCH resource of the at least one PUCCH resource. The controller 520 can determine whether there is UCI to transmit on the PUCCH resource. The transceiver 570 can transmit the particular PUSCH according to the UL grant by including the CSI report in the particular PUSCH when there is UCI to transmit on the PUCCH resource.

According to a possible embodiment, the controller 520 can cancel a UCI transmission on the PUCCH resource.

According to a possible embodiment, the controller 520 can determine whether there is UL-SCH for the PUSCH. The UCI can include at least a SR. The PUCCH resource can be a low-priority PUCCH resource. The transceiver 570 can transmit the PUSCH without including the UCI when there is no UL-SCH for the PUSCH.

According to a possible embodiment, the controller 520 can determine whether the UCI includes a SR and/or HARQ-ACK information. The controller 520 can multiplex the UCI into the transmitted PUSCH when the UCI comprises the SR and/or HARQ-ACK information. The PUCCH resource can be a low-priority PUCCH resource.

According to a possible embodiment, the CSI report can be an aperiodic CSI report in the at least one high-priority PUSCH.

According to a possible embodiment, the CSI report can be a semi-persistent CSI report. The at least one high-priority PUSCH can include semi-persistently occurring PUSCH resources. The transceiver 570 can transmit the CSI report on a semi-persistently occurring PUSCH resource of the semi-persistently occurring PUSCH resources.

According to a possible embodiment, the PUCCH resource can correspond to a high priority PUCCH. The transceiver 570 can transmit the PUSCH when the PUCCH resource corresponds to the high priority PUCCH.

According to a possible implementation, the transmitted PUSCH can include UL-SCH. The transceiver 570 can transmit the PUSCH when the PUSCH includes the UL-SCH and the PUCCH resource corresponds to the high priority PUCCH. According to a possible implementation, the CSI report can be a first CSI report. The UCI can be a SR, HARQ-ACK information and/or a second CSI report. The controller 520 can multiplex the HARQ-ACK information into the PUSCH if the UCI includes the HARQ-ACK information, exclude the SR from the PUSCH when the UCI includes the SR, and exclude the second CSI report from the PUSCH when the UCI includes the second CSI report.

According to a possible embodiment, the UCI can include at least HARQ-ACK information. The particular PUSCH can be transmitted by including low priority UL-SCH and the HARQ-ACK information of the UCI on the particular PUSCH. According to a possible implementation, an indication can be sent indicating that the low-priority UL-SCH is transmitted on the particular PUSCH. According to a possible implementation, indicating can include indicating by applying a scrambling sequence to the particular PUSCH, where the scrambling sequence corresponds to the low-priority UL-SCH. For example, different scrambling sequences can be used to indicate different priorities of the UL-SCH.

According to a possible embodiment, the PUCCH configuration can include a SR resource configuration. The SR resource configuration can include the PUCCH resource and can be associated with a SR configuration. The SR configuration can correspond to at least one logical channel. The controller 520 can determine a priority of the PUCCH resource based on at least one priority of the at least one logical channel.

According to a possible embodiment, the transceiver 570 can receive first information of a DL assignment for a first PDSCH of a serving cell. The controller 520 can identify a first PUCCH resource and a second PUCCH resource for HARQ-ACK feedback of the first PDSCH. A starting symbol of the second PUCCH resource can be later than a starting symbol of the first PUCCH resource. The transceiver 570 can receive second information of a DL assignment for a second PDSCH of the serving cell. A starting symbol of the second PDSCH can be later than a starting symbol of the first PDSCH. The controller 520 can determine whether to delay the HARQ-ACK feedback of the first PDSCH for processing of the second PDSCH. The transceiver 570 can transmit HARQ-ACK information of the first PDSCH on the second PUCCH resource in response to determining to delay the HARQ-ACK feedback of the first PDSCH.

According to a possible embodiment, the first PDSCH can be associated with a lower-priority than the second PDSCH.

According to a possible embodiment, the first PUCCH resource can be determined based on a first PUCCH resource index and a first PDSCH-to-HARQ-timing indication value. The second PUCCH resource can be determined based on a second PUCCH resource index and a second PDSCH-to-HARQ-timing indication value.

According to a possible embodiment, the transceiver 570 can transmit HARQ-ACK information of the second PDSCH on a third PUCCH resource. A starting symbol of the third PUCCH resource can be earlier than a starting symbol of the first PUCCH resource.

According to a possible embodiment, the transceiver 570 can transmit the HARQ-ACK information of the first PDSCH on the first PUCCH resource in response to the controller determining not to delay the HARQ-ACK feedback of the first PDSCH.

According to a possible embodiment, the transceiver 570 can transmit a first HARQ-ACK codebook on the first PUCCH resource and a second HARQ-ACK codebook on the second PUCCH resource in response to the controller determining to delay the HARQ-ACK feedback of the first PDSCH. The HARQ-ACK information of the first PDSCH can be included in the second HARQ-ACK codebook.

According to a possible embodiment, a method at a UE can include receiving first information of a DL assignment for a first PDSCH of a serving cell. The method can include identifying a first and second PUCCH resources for HARQ-ACK feedback of the first PDSCH. The method can include receiving second information of a DL assignment for a second PDSCH of the serving cell. The method can include determining whether to delay the HARQ-ACK feedback of the first PDSCH for processing of the second PDSCH. The method can include transmitting HARQ-ACK information of the first PDSCH on the second PUCCH resource in response to determining to delay the HARQ-ACK feedback of the first PDSCH. A starting symbol of the second PDSCH can be later than a starting symbol of the first PDSCH, and a starting symbol of the second PUCCH resource can be later than a starting symbol of the first PUCCH resource.

The first PDSCH can be associated with a lower-priority than the second PDSCH.

The first PUCCH resource can be determined based on a first PUCCH resource index and a first PDSCH-to-HARQ-timing indication value, and the second PUCCH resource can be determined based on a second PUCCH resource index and a second PDSCH-to-HARQ-timing indication value.

According to a possible implementation, the method can include transmitting HARQ-ACK information of the second PDSCH on a third PUCCH resource, wherein a starting symbol of the third PUCCH resource is earlier than a starting symbol of the first PUCCH resource.

According to a possible implementation, the method can include transmitting the HARQ-ACK information of the first PDSCH on the first PUCCH resource in response to determining not to delay the HARQ-ACK feedback of the first PDSCH.

The first and second PUCCH resources can be in a same cell. The first and second PUCCH resources can be in different cells. The DL assignment of the first PDSCH can be a dynamic or semi-persistent assignment.

The first PUCCH resource can overlap with a PUCCH including URLLC SR information and/or URLLC HARQ-ACK information and the second PUCCH resource may not overlap with the PUCCH, and the method can include transmitting the HARQ-AKC information of the first PDSCH on the second PUCCH resource.

According to a possible implementation, the method can include transmitting a first HARQ-ACK codebook on the first PUCCH resource and a second HARQ-ACK codebook on the second PUCCH resource in response to determining to delay the HARQ-ACK feedback of the first PDSCH, where the HARQ-ACK information of the first PDSCH is included in the second HARQ-ACK codebook. The HARQ-ACK information of the first PDSCH can be appended to other HARQ-ACK information of the second HARQ-ACK codebook. The first HARQ-ACK codebook can include a bit field for the HARQ-ACK feedback of the first PDSCH. The bit field for the HARQ-ACK feedback of the first PDSCH can include one or more known values. A width of the bit field for the HARQ-ACK feedback of the first PDSCH can be the same as a size of the HARQ-ACK information of the first PDSCH.

At least some methods of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

At least some embodiments can improve operation of the disclosed devices. Also, while this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is not admitted as prior art, is written as the inventor's own understanding of the context of some embodiments at the time of filing, and includes the inventor's own recognition of any problems with existing technologies and/or problems experienced in the inventor's own work.

We claim:

1. A method in a user equipment, the method comprising,
receiving first information of a downlink assignment for a first physical downlink shared channel of a serving cell;
identifying a first physical uplink control channel resource and a second physical uplink control channel resource for hybrid automatic repeat request acknowledgement feedback of the first physical downlink shared channel;
receiving second information of a downlink assignment for a second physical downlink shared channel of the serving cell;
determining whether to delay the hybrid automatic repeat request acknowledgement feedback of the first physical downlink shared channel for processing of the second physical downlink shared channel; and
transmitting hybrid automatic repeat request acknowledgement information of the first physical downlink shared channel on the second physical uplink control channel resource in response to determining to delay the hybrid automatic repeat request acknowledgement feedback of the first physical downlink shared channel,
wherein a starting symbol of the second physical downlink shared channel is later than a starting symbol of the first physical downlink shared channel,
wherein a starting symbol of the second physical uplink control channel resource is later than a starting symbol of the first physical uplink control channel resource,
wherein the method further comprises transmitting a first hybrid automatic repeat request acknowledgement codebook on the first physical uplink control channel resource and a second hybrid automatic repeat request acknowledgement codebook on the second physical uplink control channel resource in response to determining to delay the hybrid automatic repeat request acknowledgement feedback of the first physical downlink shared channel, wherein the hybrid automatic repeat request acknowledgement information of the first physical downlink shared channel is included in the second hybrid automatic repeat request acknowledgement codebook.

2. The method according to claim 1, wherein the first physical downlink shared channel is associated with a lower-priority than the second physical downlink shared channel.

3. The method according to claim 1,
wherein the first physical uplink control channel resource is determined based on a first physical uplink control channel resource index and a first physical downlink shared channel-to-hybrid automatic repeat request-timing indication value, and
wherein the second physical uplink control channel resource is determined based on a second physical uplink control channel resource index and a second physical downlink shared channel-to-hybrid automatic repeat request-timing indication value.

4. The method according to claim 1, further comprising transmitting hybrid automatic repeat request acknowledgement information of the second physical downlink shared channel on a third physical uplink control channel resource,
wherein a starting symbol of the third physical uplink control channel resource is earlier than a starting symbol of the first physical uplink control channel resource.

5. The method according to claim 1, further comprising transmitting the hybrid automatic repeat request acknowledgement information of the first physical downlink shared channel on the first physical uplink control channel resource in response to determining not to delay the hybrid automatic repeat request acknowledgement feedback of the first physical downlink shared channel.

6. The method according to claim 1, wherein the hybrid automatic repeat request acknowledgement information of the first physical downlink shared channel is appended to other hybrid automatic repeat request acknowledgement information of the second hybrid automatic repeat request acknowledgement codebook.

7. The method according to claim 1, wherein the first hybrid automatic repeat request acknowledgement codebook includes a bit field for the hybrid automatic repeat request acknowledgement feedback of the first physical downlink shared channel.

8. The method according to claim 7, wherein the bit field for the hybrid automatic repeat request acknowledgement feedback of the first physical downlink shared channel includes one or more known values.

9. The method according to claim 7, wherein a width of the bit field for the hybrid automatic repeat request acknowledgement feedback of the first physical downlink shared channel is a same size as a size of the hybrid automatic repeat request acknowledgement information of the first physical downlink shared channel.

10. The method according to claim 1, wherein the first and second physical uplink control channel resources are in a same cell.

11. The method according to claim 1, wherein the first and second physical uplink control channel resources are in different cells.

12. The method according to claim 1, wherein the downlink assignment of the first physical downlink shared channel is a dynamic or semi-persistent assignment.

13. The method according to claim 1,
wherein the first physical uplink control channel resource overlaps with a physical uplink control channel including at least one selected from ultra-reliable low latency communication scheduling request information and ultra-reliable low latency communication hybrid automatic repeat request acknowledgement information,
wherein the second physical uplink control channel resource does not overlap with the physical uplink control channel, and
wherein the method further comprises transmitting the hybrid automatic repeat request acknowledgement information of the first physical downlink shared channel on the second physical uplink control channel resource.

14. An apparatus comprising,
a transceiver that receives first information of a downlink assignment for a first physical downlink shared channel of a serving cell; and
a controller coupled to the transceiver, where the controller identifies a first physical uplink control channel resource and a second physical uplink control channel resource for hybrid automatic repeat request acknowledgement feedback of the first physical downlink shared channel,
wherein the transceiver receives second information of a downlink assignment for a second physical downlink shared channel of the serving cell,
wherein the controller determines whether to delay the hybrid automatic repeat request acknowledgement feedback of the first physical downlink shared channel for processing of the second physical downlink shared channel,
wherein the transceiver transmits hybrid automatic repeat request acknowledgement information of the first physical downlink shared channel on the second physical uplink control channel resource in response to determining to delay the hybrid automatic repeat request acknowledgement feedback of the first physical downlink shared channel,
wherein a starting symbol of the second physical downlink shared channel is later than a starting symbol of the first physical downlink shared channel,
wherein a starting symbol of the second physical uplink control channel resource is later than a starting symbol of the first physical uplink control channel resource,
wherein the transceiver transmits a first hybrid automatic repeat request acknowledgement codebook on the first physical uplink control channel resource and a second hybrid automatic repeat request acknowledgement codebook on the second physical uplink control channel resource in response to the controller determining to delay the hybrid automatic repeat request acknowledgement feedback of the first physical downlink shared channel, and
wherein the hybrid automatic repeat request acknowledgement information of the first physical downlink shared channel is included in the second hybrid automatic repeat request acknowledgement codebook.

15. The apparatus according to claim 14, wherein the first physical downlink shared channel is associated with a lower-priority than the second physical downlink shared channel.

16. The apparatus according to claim 14,
wherein the first physical uplink control channel resource is determined based on a first physical uplink control channel resource index and a first physical downlink shared channel-to-hybrid automatic repeat request-timing indication value, and wherein the second physical uplink control channel resource is determined based on a second physical uplink control channel resource index and a second physical downlink shared channel-to-hybrid automatic repeat request-timing indication value.

17. The apparatus according to claim 14, wherein the transceiver transmits hybrid automatic repeat request acknowledgement information of the second physical downlink shared channel on a third physical uplink control channel resource, and wherein a starting symbol of the third physical uplink control channel resource is earlier than a starting symbol of the first physical uplink control channel resource.

18. The apparatus according to claim 14, wherein the transceiver transmits the hybrid automatic repeat request acknowledgement information of the first physical downlink shared channel on the first physical uplink control channel resource in response to the controller determining not to delay the hybrid automatic repeat request acknowledgement feedback of the first physical downlink shared channel.

\* \* \* \* \*